(12) United States Patent
DeRoche et al.

(10) Patent No.: US 6,976,811 B1
(45) Date of Patent: Dec. 20, 2005

(54) MILLING CUTTER

(75) Inventors: Kenneth G. DeRoche, Greensburg, PA (US); Howard W. Frye, Oswego, IL (US); Ronald L. Dudzinsky, Derry, PA (US); Mark A. Francis, Solon, OH (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 09/678,923

(22) Filed: Oct. 4, 2000

(51) Int. Cl.$^7$ .................................................. B23C 5/20
(52) U.S. Cl. ........................................ 407/56; 407/63
(58) Field of Search ........................... 407/56, 57, 58, 407/59, 60, 61, 63

(56) References Cited

U.S. PATENT DOCUMENTS

| | | | |
|---|---|---|---|
| 4,182,587 A | 1/1980 | Striegl | 407/113 |
| 4,714,383 A | 12/1987 | Shimomura et al. | 407/42 |
| 4,844,666 A | 7/1989 | Tsujimura et al. | 407/34 |
| 4,963,059 A | 10/1990 | Hiyama | 407/60 |
| 5,083,887 A | 1/1992 | Dotany | 407/59 |
| 5,425,603 A | 6/1995 | Dutschke et al. | 407/40 |
| 5,762,452 A * | 6/1998 | Mina | 407/34 |
| 5,904,449 A * | 5/1999 | Satran et al. | 407/59 |
| 5,913,644 A | 6/1999 | DeRoche et al. | 407/42 |
| 5,947,649 A * | 9/1999 | Arail et al. | 407/34 |

FOREIGN PATENT DOCUMENTS

| | | |
|---|---|---|
| DE | 3727968 | 2/1988 |
| EP | 0278389 | 8/1988 |
| WO | 9317822 | 9/1993 |

OTHER PUBLICATIONS

Kennametal Inc. Advertisement No. A99-7C "High-Temp Milling Innovations—Revolutioanry Helical End Mill Increases Metal Removal Rates Up to 300%!" (1999).
Kennametal Inc. Advertisement No. A99-7B "Steel Milling Innovations—Revolutionary Helical End Mill Increases Metal Removal Rates Up to 300%?" (1999).
Kennametal Inc. Advertisement No. A99-7A "Stainless Steel Milling Innovations—Revolutionary Helical End Mill Increases Metal Removal Rates Up to 300%!" (1999).

* cited by examiner

*Primary Examiner*—Henry W. H. Tsai
(74) *Attorney, Agent, or Firm*—Larry R. Meenan

(57) ABSTRACT

A cutting tool for cutting a workpiece comprising a tool body having an outer surface thereon and a central axis therein and including at least a first and second spiraling flute in the outer surface, each flute including a plurality of inserts secured therein to define an axial rake angle, wherein the axial rake angle of the inserts varies between flutes and within each flute.

7 Claims, 4 Drawing Sheets

MILLING CUTTER

FIELD OF THE INVENTION

The present invention relates generally to metal cutting tools and more particularly to helical cutting tools such as end mills and face mills. Specifically, the present invention relates to a milling cutter including multiple flutes having inserts wherein the axial rake angle of the inserts varies between each flute and within each flute.

BACKGROUND OF THE INVENTION

Helical end mills and face mills are well known in the industry. Conventional helical end mills include those shown on pages 182–216 in Kennametal's Milling Catalog No. 5040, copyright 1995.

One form of helical mill that has been in use for years is a helical mill where the cutting edge of each insert is axially spaced apart from the cutting edge of the next adjacent insert and where the inserts in each helix are staggered such that two or more rows are necessary to produce one complete or "all effective" cutting edge. Such a design is shown by the Kennametal 0 degree Lead—Helical End Mills, as shown on page 188 of the above referenced Milling Catalog. One of the disadvantages of such design is that the lead insert in at least one helix must either be of a different length or offset inward and thus incapable of face milling. This is a result of the need to stagger the inserts in each helix. Consequently, all of the inserts are generally not the same and thus not interchangeable, thus requiring the manufacture and inventory of multiple inserts.

These staggered helix and other conventional mills are sufficient for their intended purposes and thus many cutting processes; however, further improvements in the design and effectiveness of a helical mill is desired.

One such solution is described in U.S. Pat. No. 5,083,887. In this solution, the cutting inserts are disposed in a helical array in which the cutting edge of each insert, with respect to the cutting tool, is spaced in the circumferential direction from the seat of the next adjacent insert and is in overlapping relationship in the axial direction with the cutting edge of the next adjacent insert, and the radially extending edges of each insert are in overlapping relation with the radially extending edges of the adjacent inserts, such that the cutting edge of all of the inserts in any one flute define a continuous, non-interrupted, cutting line of stepped configuration. This solution has become known as single flute "all-effective" milling.

Although this single flute "all effective" mill provides a helical end mill using only one type of insert and needing only one flute for "all effective" cutting, the industry continues to strive for improved "all effective" milling whether it be single flute or double flute "all effective." In particular, the industry continues to strive for even better surface finishing, smoother cutting action, reduced vibrations, reduced hammering, reduced chattering, more economical cutters, more durable cutters, longer lasting cutters, and more simplistic designs for easier and faster manufacture and insert replacement.

Accordingly, it is an object of the present invention to provide an improved helical mill, such as an end mill or face mill. It is a further objective of the present invention to provide such an improved helical mill which provides for "all effective" cutting. It is a further objective of the present invention to provide such an improved helical mill which includes non-uniform flutes and/or insert seats on the flutes including differing rake angles between flutes and between the inserts along a single flute.

It is further an objective of the present invention to provide some or all of the following in comparison to the current mills: better surface finishing, smoother cutting action, reduced vibrations, reduced hammering, reduced chattering, more economical cutters, more durable cutters, longer lasting cutters, less horsepower consumption during cutting, and more simplistic designs for easier and faster manufacture and insert replacement.

SUMMARY AND OBJECTS OF THE INVENTION

Briefly, the present invention relates to a cutting tool for cutting a workpiece. The cutting tool includes a tool body having an outer surface thereon and a central axis therein and at least a first and second spiraling flute in the outer surface. Each flute includes a plurality of inserts secured therein to define an axial rake angle, wherein the axial rake angle of the inserts varies between flutes and within each flute.

In a preferred embodiment, the axial rake angle is selectively varied around the circumference of the toolbody to form a staggered sequential repeating matrix.

BRIEF DESCRIPTION OF THE DRAWINGS

The above, as well as other features and advantages of the invention, will become apparent through consideration of the detailed description in connection with the several drawings in which.

DETAILED DESCRIPTION OF THE INVENTION

Figure 1:
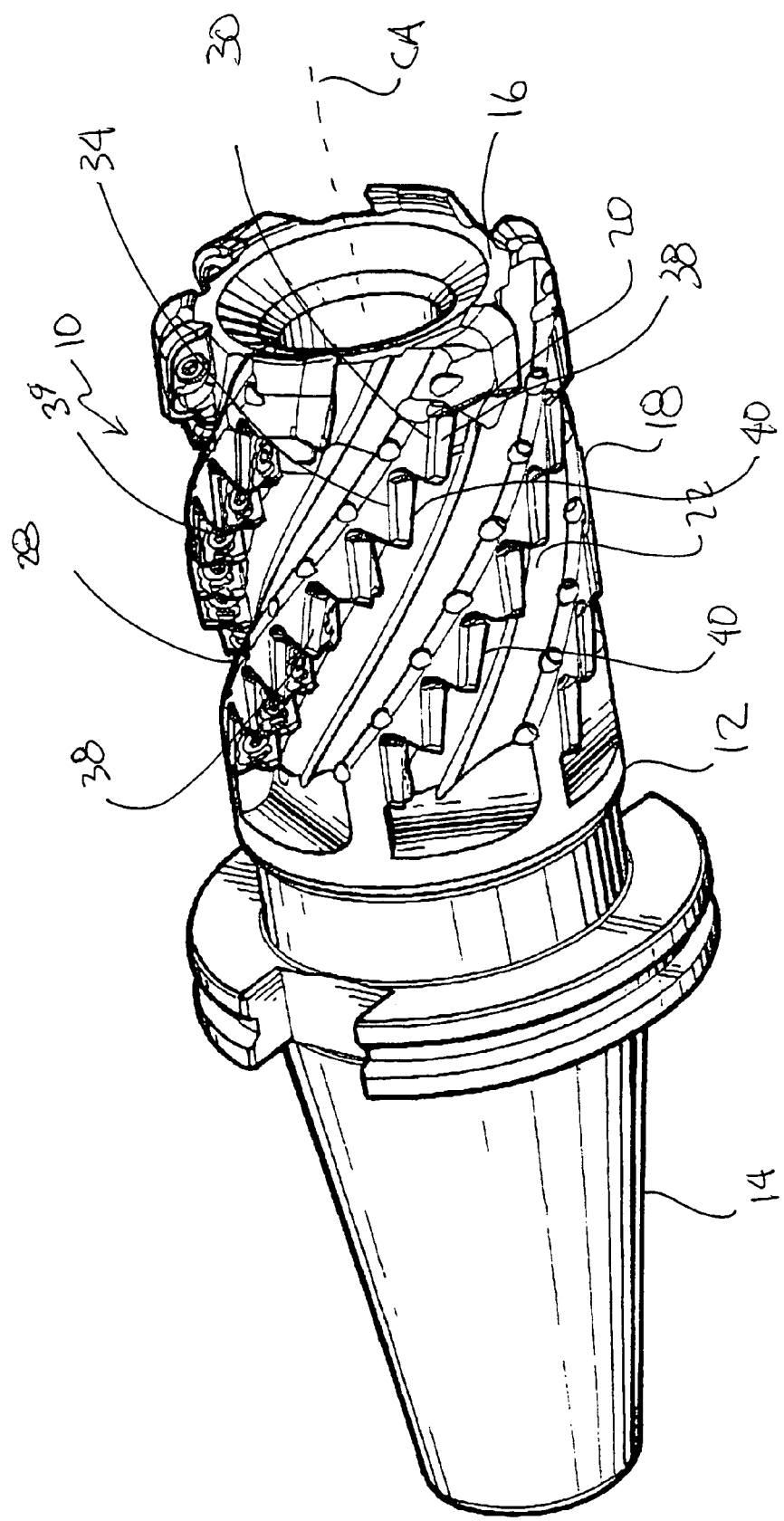
FIG. 1 is a perspective view of a helical end mill with multiple flutes having inserts seated therein where inserts in adjacent flutes are at differing axial rake angles.

Referring to the drawings wherein like reference characters designate like elements there is shown a helical cutting tool 10, such as an end mill, face mill, or any other known mill. It will be appreciated that although the invention is described in relation to a multiple fluted helical end mill, the inventive concept of differing rake angles both along a single flute and between two or more flutes is applicable to most any suitable cutting tool.

As shown in FIG. 1, the helical end mill 10 includes a tool body 12 and a shank 14. The shank 14 is configured so as to be capable of insertion and securing within a spindle of a milling or other cutting machine (not shown) as is well known in the art. The shank 14 may be of any shape or design so as to be capable of this insertion and securing. Such designs include, but are not limited to, V-flange, taper, shell mill mount, and Weldon shank. Obviously, should the mill instead be a face mill, then no shank exists as is well known in the art.

The tool body 12 is a substantially cylindrical body with a central axis CA. The tool body 12 extends axially from the shank 14 to an end face 16 thereby defining an exterior surface 18 therebetween. The exterior surface 18 of the tool body 12 preferably includes a plurality of helical grooves. It will be appreciated that most any number of helical grooves may be formed in the tool body 12. The overall perspective view in FIG. 1 shows helical grooves 20 and 22. Each groove 20 and 22 is preferably cut into the exterior surface 18 in a helical or spiral manner that extends from the end face 16 to substantially the shank 14.

Figure 2:
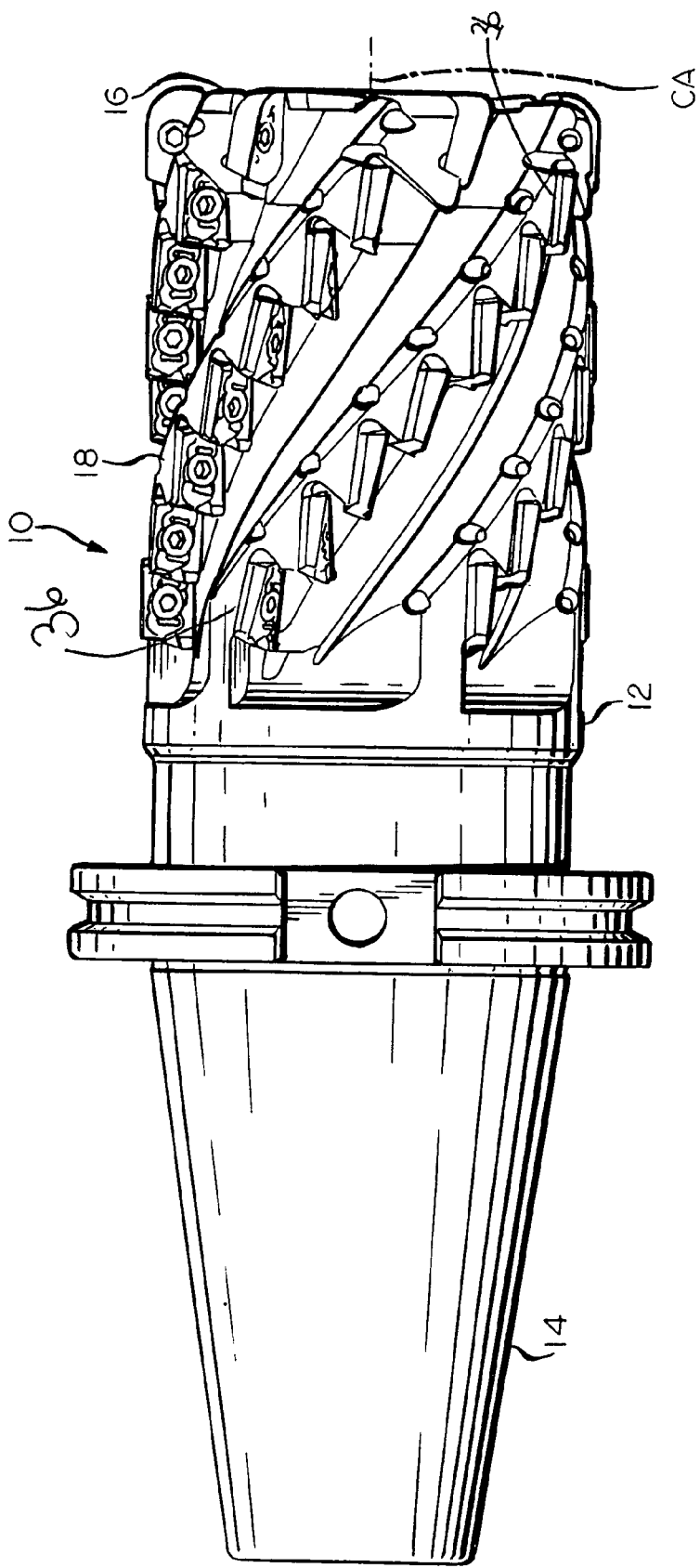
FIG. 2 is a side view of the helical end mill of FIG. 1.
Figure 3:
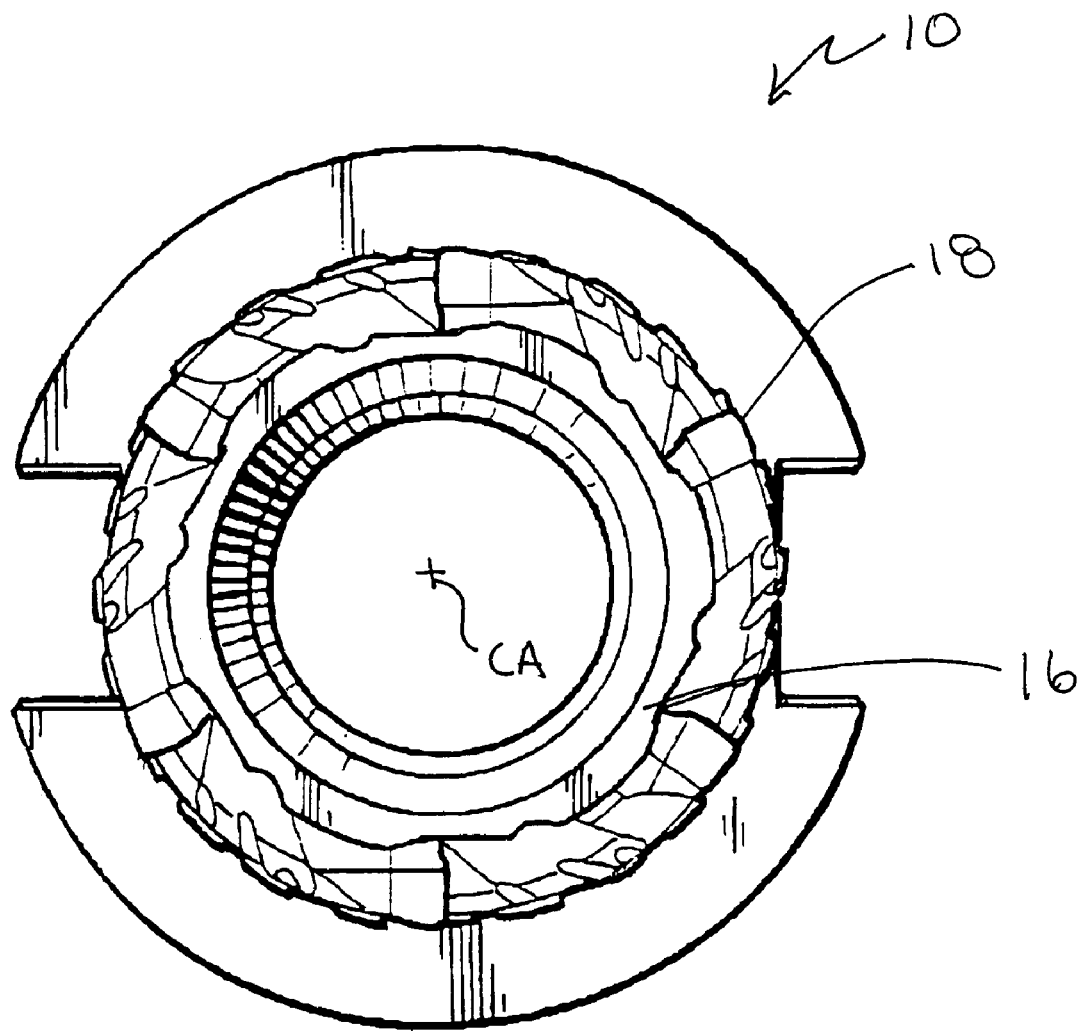
FIG. 3 an end view of the helical end mill of FIG. 1.

Each helical groove 20 and 22 generally includes a pair of opposing faces, specifically a leading face 28 and a trailing face 30, defining a carved out flute area therebetween as best shown in FIGS. 1 and 2. The leading face 28 and trailing face 30 may either intersect at the radially most inward portion of the flute (thus defining a generally V-shaped radial cross section to the flute), or alternatively, a base face may connect the leading and trailing faces (thus defining a generally U-shaped cross section to the flute). For a more detailed discussion of the helical groove reference is made to U.S. Pat. No. 5,913,644, incorporated herein by reference.

Each leading face 28 spirals cutting inward from the exterior surface 18 such that the face is approximately radial to the central axis of the substantially cylindrical shank 14 as shown in FIG. 1 when viewed from any given radial plane. Such spiraling may be either clockwise or counter-clockwise. In contrast, each trailing face 30 is actually a plurality of stepped seats 34.

An insert 38 is affixed to each seat 34 in each groove 20 and 22. As shown in FIGS. 1 and 2, each insert is affixed to each insert using a screw 39 with a tapered head insertable through a correspondingly tapered hole (not shown) in each insert and then threaded into a threaded hole in the respective seat 34. It is within the scope of the invention that any known insert securing method and device may be used including all those well recognized in the art without altering the invention.

The inserts may generally be of any known construction, size, shape, or configuration so long as the inserts securely and properly fit the seat 34 in the intended manner. Examples of such inserts include those inserts described on pages 7–132 in the above referenced Kennametal Milling catalog. Specific examples include the ADKT or LFEW style inserts described therein.

The seats 34 and the inserts 38 thereon are positioned and stepped such that the inserts may or may not circumferentially overlap. In the embodiments shown, the inserts do slightly overlap. However, it is clearly within the invention and fitting of the objectives to separate the inserts circumferentially.

Each insert 38 includes at least one cutting edge 40 as shown in FIG. 1. Because of the nature of the invention and the varying axial rake faces providing "all effective" cutting as described in detail below, the cutting edges 40 of adjacent inserts need not overlap although the actual inserts may or may not. It is however contemplated by the invention that the actual cutting edges could also overlap and as such this is part of the invention.

The seats 34 each include a radial rake angle and an axial rake angle. The radial rake angle is the angle between the seat face 36 and the work surface. It is the radial tilt of the seat 34 or the insert seated thereon when viewed from an outer cutting edge to inner edge and center axis perspective. With respect to this invention, the inventive features work regardless of the angle of the radial rake.

Figure 4:
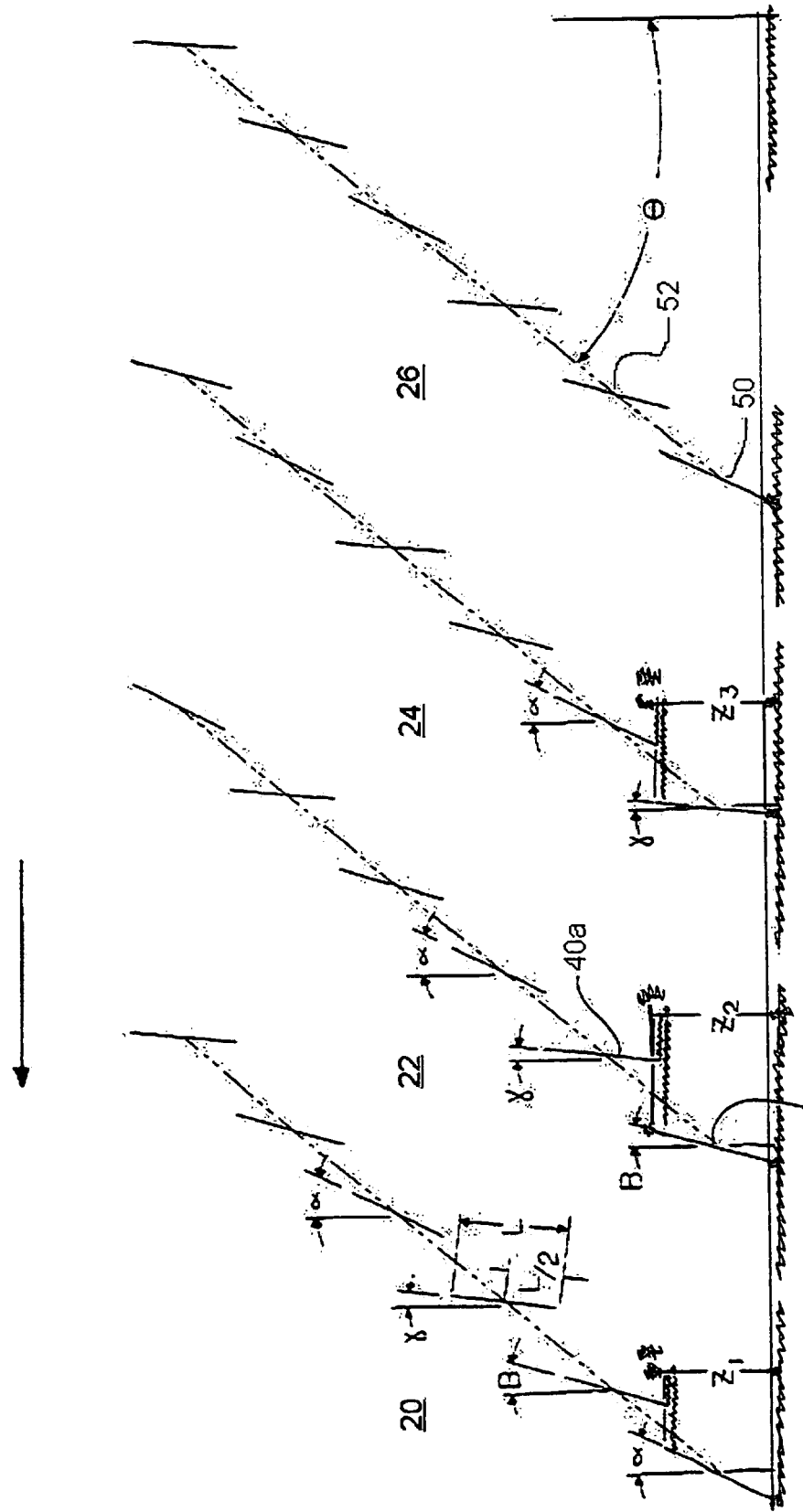
FIG. 4 is a two dimensional projection of the top faces of the inserts taken from the helical first, second and third flutes to show the differing axial rake angle between flutes and inserts.

As shown in FIG. 4, the axial rake angle is the axial tilt of the seat 34 and/or the insert seated thereon in an end-to-end manner. More particularly, the axial rake angle is the angle between the center axis CA of the tool body 10 and any plane parallel to the cutting edge of the insert, in the radial view, seated in the seat face 36.

Referring to FIG. 4, there is shown an example where three angles $\alpha_{nm}$, $\beta_{nm}$ and $\gamma_{nm}$ (wherein n= insert row and m=flute column) are regularly patterned on a three-fluted cutter. Although the present invention is illustrated using three angles $\alpha_{nm}$, $\beta_{nm}$ and $\gamma_{nm}$ on a three-fluted cutter, it will be appreciated that the angles, number of flutes and pattern of angles and flutes may be varied as desired in accordance with the present invention. Furthermore, the hand of cut can be either right or left handed as well as the helix and the helix does not have to be on a continuous angle but may be varied as the helix progresses from the cutter face to the maximum axial depth of cut.

As shown in FIG. 4, the axial rake angle $\alpha_{nm}$ (wherein n=the insert row and m=flute column) in helical groove 20, is different from the axial rake angle $\beta_{nm}$ (wherein n=the insert row and m=flute column) in helical groove 22 and is different from the axial rake angle $\gamma_{nm}$ (wherein n=the insert row and m= flute column) in helical groove 24. The axial rake angles $\alpha_{nm}$, $\beta_{nm}$ and $\gamma_{nm}$ vary for each insert row n within each flute column m, e.g. 22, 24 and 26. By varying the rake angles $\beta_{nm}$, $\beta_{nm}$ and $\gamma_{nm}$ of insert to give an approximate lead angle in each individual pocket and/or each flute, the effect is a more homogeneous display of cutting edges as the inserts are presented to the workpiece. It will be appreciated that this homogeneity tends to distribute the impact of the cutting edges upon the workpiece more irregularly, thereby breaking up the harmonics. In addition to the effect on harmonics, the present invention allows for the influence of individual inserts cut length and effective rake angle the result of change to pitch. Here the center point of the inserts leading edge is located on an equally spaced arrangement of the flutes. However, because of the varying angle of the inserts, the circumferential distance between all points on the inserts leading edges are not equal, the exception being the distance between the aforementioned center points.

The inserts may be arranged with or without overlapping the inserts' leading edges in one flute, for the following flutes insert arrangement can be such that there are no significant amounts of uncut material from the preceding flute's cut.

It will be appreciated that as a result, the effective axial length Z1, Z2, Z3 of the inserts also varies between grooves inversely to the axial rake angle. More particularly, as shown in FIG. 4, row 1, the effective axial length Z3 of insert in groove 24 is longer than the effective axial length Z2 of the insert in groove 22 which is longer that the effective axial length Z1 of the insert in groove 20, although the insert dimensions including overall length L are identical. Referring to row 2, the effective axial length Z2 of insert in groove 22 is longer than the effective axial length Z1 of insert in groove 24 which is longer than the effective axial length Z3 of the insert in groove 20. The calculation of this effective axial length is a geometric calculation where the effective axial length of the insert is one side of the triangle, the actual insert length is the longest side of the triangle, and the axial rake angle is the inclusive angle therebetween.

If these effective axial lengths Z, which are approximate the actual cutting length of each insert, are projected into a two dimensional view, they appear as shown in FIG. 4. The differing axial rakes equate to differing circumferential cutting lengths as shown by the differences between 40a and 40b. The use of multiple flutes with inserts positioned at different axial rakes is an "all effective" cutting because the ridges, peaks, or other undulations caused by the cutting edges of adjacent inserts not overlapping are milled away by the inserts in the adjacent flute that are not aligned in cross section due to the differing axial rakes.

The actual angles of $\alpha$, $\beta$, $\gamma$ may be any angles between 0 degree and 90 degree. So long as the inserts in adjacent flutes do not terminate in the same cross sections. This is best shown in FIG. 4 by lines 50 and 52 whereby the benefits of this invention are achieved so long as lines 50 and 52 do not overlap.

Alternatively, the inserts in flutes 20 and 24, and in flutes 22 and 26, could be differently designed such that the seats 36 on the mill are identical, while the inserts provide for the differing axial rake angles. The invention only requires different axial rake at the cutting edge so the supplying of this axial rake may be based on the seat angle, the insert design, or both. If it is provided by the insert, the insert would then be thicker at one end with a smooth thickness transition to a thinner end.

In sum, the multiple flute end mill 10 provides for "all effective" milling regardless of overlap of cutting edges or actual insert bodies in a given flute. An inventive feature is the varying of the axial rake angles between flutes and within the same flute which, in effect, varies the effective axial length of the inserts. By providing flutes with inserts thereon of differing axial lengths, the inserts are staggered and prove "all effective" cutting.

As previously indicated, the inventive feature of the invention of differing rake angles in the flutes is applicable to helical end mills, as shown in the figures, as well as face mills and other mills. It is also applicable to tool bodies other than cylindrical tool bodies, such as conical tool bodies.

The documents identified herein are hereby incorporated by reference.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. An all effective cutting tool for cutting a workpiece comprising:
a tool body having an outer surface thereon and a central axis therein and including at least a first and second spiraling flute in the outer surface, each flute including a plurality of inserts secured therein to define an axial rake angle, wherein the axial rake angle of the inserts varies between flutes and within each flute to provide single flute all effective cutting, and wherein the axial rake angles of at least three adjacent inserts within each flute either progressively decrease then increase or increase then decrease.

2. The cutting tool of claim 1 wherein all of the inserts on the entire tool body are identical.

3. The cutting tool of claim 1 wherein the tool body includes three spiraling flutes, wherein each spiraling flute has a first, second and third axial rake angle.

4. The cutting tool of claim 3 wherein all of the inserts on the entire tool body are identical.

5. The cutting tool of claim 4 wherein each insert has an actual length longer than the cutting edge, and the actual lengths of adjacent inserts in any single flute do not circumferentially overlap.

6. The cutting tool of claim 1 wherein the inserts each have a cutting edge and the cutting edges on adjacent inserts in any single flute do not circumferentially overlap.

7. The cutting tool of claim 1 wherein the inserts each have a cutting edge and the cutting edges on inserts with differing axial rake angles have differing cutting edge lengths.

* * * * *